(12) United States Patent
Musmaker et al.

(10) Patent No.: US 7,984,784 B2
(45) Date of Patent: Jul. 26, 2011

(54) DIRECTIONAL TRANSMISSION CONTROL WITH ECU AUTHORIZATION

(75) Inventors: Bruce Allan Musmaker, Asbury, IA (US); Andrew William Neebel, Dubuque, IA (US)

(73) Assignee: Deere & Company, Moline, IL (US)

( * ) Notice: Subject to any disclaimer, the term of this patent is extended or adjusted under 35 U.S.C. 154(b) by 116 days.

(21) Appl. No.: 12/470,965

(22) Filed: May 22, 2009

(65) Prior Publication Data

US 2009/0288903 A1 Nov. 26, 2009

Related U.S. Application Data

(60) Provisional application No. 61/055,922, filed on May 23, 2008.

(51) Int. Cl.
*B60K 17/00* (2006.01)
(52) U.S. Cl. .................... 180/336; 180/337
(58) Field of Classification Search .......... 180/334, 180/336, 37, 347, 337
See application file for complete search history.

(56) References Cited

U.S. PATENT DOCUMENTS

| | | | | | |
|---|---|---|---|---|---|
| 4,226,295 | A | * | 10/1980 | Rembold et al. | 180/335 |
| 4,499,793 | A | * | 2/1985 | Jow et al. | 477/78 |
| 4,699,239 | A | * | 10/1987 | Ishino et al. | 180/315 |
| 4,734,861 | A | * | 3/1988 | Bertolasi et al. | 701/67 |
| 5,021,764 | A | * | 6/1991 | Mabee | 340/439 |
| 5,035,158 | A | * | 7/1991 | Leigh-Monstevens | 477/36 |
| 5,042,314 | A | * | 8/1991 | Rytter et al. | 74/335 |
| 5,558,175 | A | * | 9/1996 | Sherman | 180/65.25 |
| 5,934,403 | A | * | 8/1999 | Moore et al. | 180/336 |
| 6,084,315 | A | * | 7/2000 | Schmitt | 307/10.1 |
| 6,237,712 | B1 | * | 5/2001 | Lehman et al. | 180/337 |
| 6,490,509 | B1 | * | 12/2002 | Sato et al. | 701/1 |
| 6,851,495 | B2 | * | 2/2005 | Sprinkle et al. | 180/53.2 |
| 7,044,260 | B2 | * | 5/2006 | Schaedler et al. | 180/336 |
| 7,131,509 | B2 | * | 11/2006 | Harvey et al. | 180/53.6 |
| 7,334,658 | B2 | * | 2/2008 | Berg et al. | 180/333 |
| 2005/0115759 | A1 | * | 6/2005 | Langer et al. | 180/337 |
| 2006/0090951 | A1 | * | 5/2006 | Waits | 180/336 |
| 2007/0289803 | A1 | * | 12/2007 | Yoshikawa et al. | 180/336 |

* cited by examiner

*Primary Examiner* — Paul N Dickson
*Assistant Examiner* — Nicole Verley
(74) *Attorney, Agent, or Firm* — Baker & Daniels LLP

(57) ABSTRACT

A vehicle is disclosed that includes a transmission and a gear selector. A controller determines the position of the gear selector and other conditions of the vehicle to control the operation of the transmission.

20 Claims, 1 Drawing Sheet

US 7,984,784 B2

DIRECTIONAL TRANSMISSION CONTROL WITH ECU AUTHORIZATION

RELATED APPLICATION

This application claims priority to U.S. Provisional Patent Application Ser. No. 61/055,922, filed May 23, 2008, titled "Directional Transmission Control with ECU Authorization", to Musmaker et al., the entire disclosure of which is expressly incorporated by reference herein.

FIELD OF THE INVENTION

The present disclosure relates to a transmission control.

BACKGROUND AND SUMMARY OF THE INVENTION

Vehicles often include an engine and a transmission for converting the output speed and torque of the engine to a preferred direction, speed, and torque for vehicle traction devices, such as wheels or tracks. Electronic control units (ECU) are used to control the input to the transmission to provide the preferred direction, speed and torque.

According to one embodiment of the present disclosure, a vehicle is provided including a chassis; a plurality of traction devices positioned to support the chassis; an engine to power at least one of the plurality of traction devices; a transmission positioned between the engine and the at least one traction device; and means for controlling the transmission. The control means includes an operator input and a controller configured to provide sufficient power to control the transmission through the operator input. The controller is configured to monitor the operator input to determine when to provide the sufficient power.

According to another aspect of the present disclosure, a vehicle is provided including a chassis; a plurality of traction devices positioned to support the chassis; an engine to power at least one of the plurality of traction devices; a transmission positioned between the engine and the at least one traction device; a gear selector positioned to receive input from an operator of the vehicle to determine the direction of travel of the vehicle; a controller configured to receive input from the gear selector and control operation of the transmission, and a communication line providing communication from the controller to the transmission, The gear selector is positioned along the communication line between the controller and the transmission.

According to another aspect of the present disclosure, a vehicle is provided including a chassis; a plurality of traction devices positioned to support the chassis; an engine to power at least one of the plurality of traction devices; a transmission positioned between the engine and the at least one traction device; a gear selector positioned to receive input from an operator of the vehicle to determine the direction of travel of the vehicle; a controller configured to receive input from the gear selector and control operation of the transmission, and a power line providing operative power to the transmission and a signal to the controller. The controller determines the input of the operator to the gear selector based on the signal received from the power line.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein.

Figure 1:
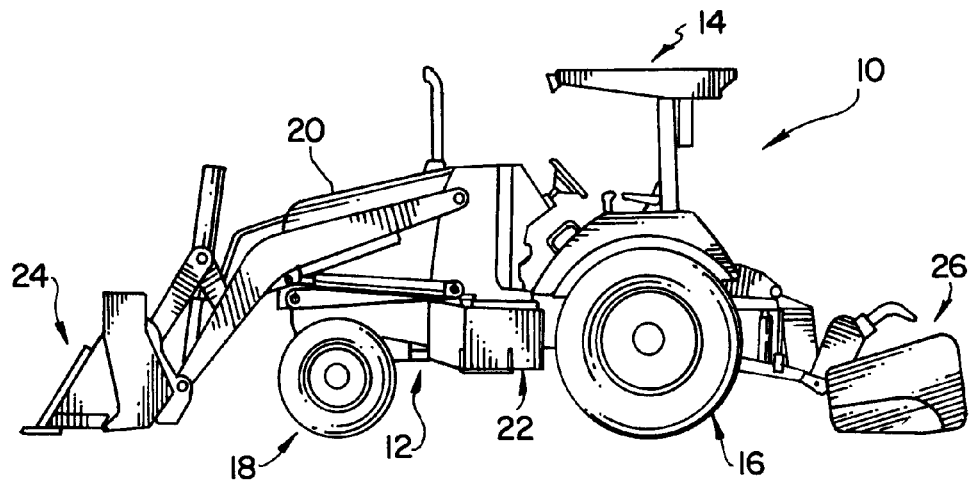
FIG. 1 is a side elevation view of a loader that includes an engine and transmission.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Landscape loader 10 is shown in FIG. 1 for moving and grading materials, such as dirt, gravel, mulch, and other materials. Loader 10 includes chassis 12, operator cab 14, and a plurality of rear wheels 16, also described as traction devices, to propel chassis 12 and the remainder of loader 10 along the ground, a pair of front steerable wheels 18, which may also be described as traction devices, engine 20 to power operation of loader 10, transmission 22 transmitting power from engine 20 to rear and front wheels 16, 18, loader bucket 24, and box blade 26.

Although a loader is described in detail, the features described herein may be provided on other vehicles such as bull dozers, motor graders, and other construction vehicles having various ground engaging tools and traction devices, such as wheels and tracks. Loader bucket 24 and box blade 26 are described as a ground engaging blades, but are not limited to engagement with soil, dirt, gravel, etc. They and other ground engaging blades, such as dozer blades, snow plows, or snow may also engage other materials, such as snow.

Figure 2:
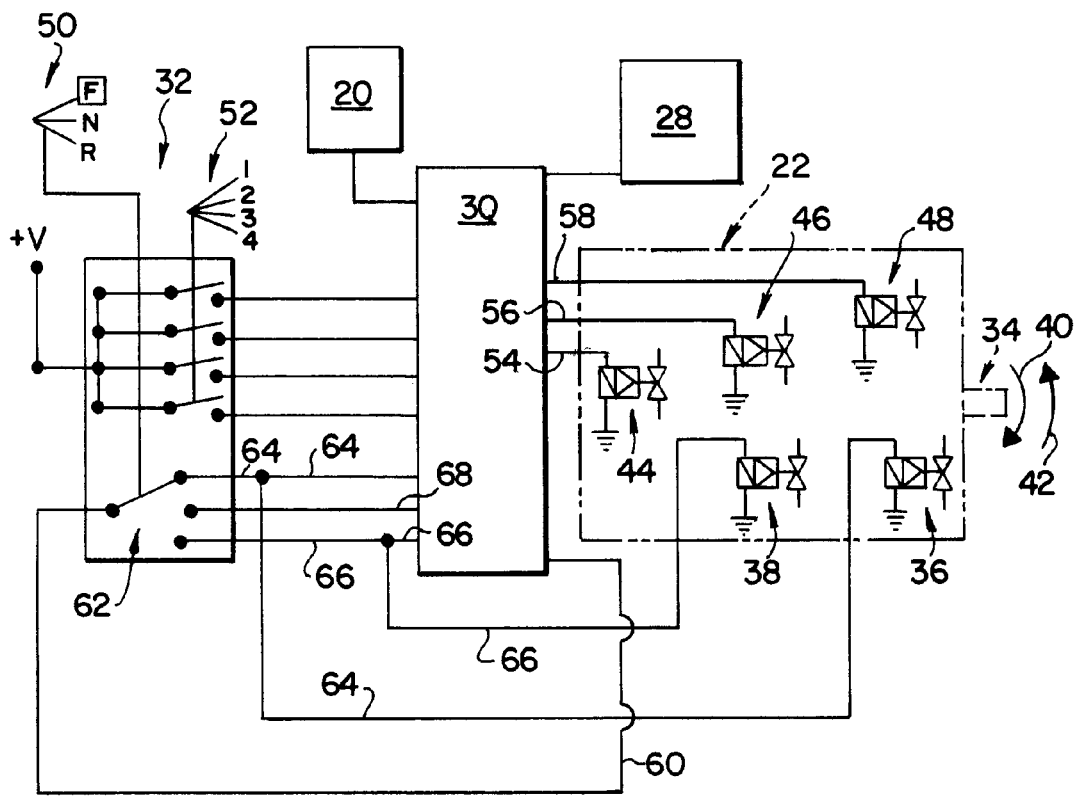
FIG. 2 is a schematic view of a control system for the transmission and brakes of the vehicle of FIG. 1.

As shown in FIG. 2, engine 20, transmission 22, parking brake 28, and other components of loader 10 are controlled by ECU/control system/controller 30. Controller 30 responds to inputs, such as transmission control lever 32 or other gear selector/operator input, engine 20, and other inputs and provides outputs to engine 20, transmission 22, parking brake 28, and other components of loader 10.

Transmission control lever 32 is an operator input that controls transmission 22 through controller 30. Transmission 22 is coupled to an output (not shown) of engine 20 and converts the speed and torque of this output into a direction, speed, and torque provided by transmission output 34. Input from transmission control lever 32 controls the direction, speed, and torque of transmission output 34.

Transmission 22 includes components, such as solenoids 36, 38, 44, 46, 48, other electromechanical devices, or other components, that determine the direction, speed, and torque of transmission output 34. When energized, forward solenoid 36 and reverse solenoid 38 control the supply of pressurized fluid to respective forward and reverse engagement mechanisms (not shown) of transmission 22, such as a clutches and gears, to control the direction of rotation of transmission output 34 in first direction 40 and opposite second direction 42, respectively. When energized, gear or speed solenoids 44, 46, 48 control the speed and torque from transmission output 34.

An operator provides input to transmission control lever 32 to at least partially control transmission 22. Under normal operating conditions, an operator may position TCL switch/handle 50 to one of a forward (shown), neutral, or reverse position to provide forward, neutral, and reverse selections that control the direction of transmission output 34. An operator may position gear handle 52 to one of first, second, third, and fourth positions.

When TCL handle 50 is in the forward position, an operator may move gear handle 52 to any of the first, second, third, and fourth positions to provide different forward speeds for loader 10. Under normal operating conditions, when gear handle 52 is in the first position and TCL handle 50 is in the forward position, controller 30 provides voltage to a combination of lines 54, 56, 58 to energize a combination of speed solenoids 44, 46, 48 to provide a first gear ratio. When gear handle is in the second, third, or fourth positions and TCL handle 50 is in the forward position, controller 30 provides voltages to different combinations of lines 54, 56, 58 to energize different combinations of speed solenoids 44, 46, 48 to provide different gear ratios. Similarly, when TCL handle 50 is in the reverse position, an operator may move gear handle 52 to the first and second positions to provide two different reverse speeds for loader 10.

Under normal operating conditions, controller 30 provides a solenoid power signal to transmission control lever 32 through line 60 that is sufficient to energize (or keep energized) solenoids 36, 38. When handle 50 is in the forward position, multi-position switch 62 connects the solenoid power signal of line 60 to line 64 that extends to forward solenoid 36, which causes transmission output 34 to move in first direction 40. Line 64 also connects to controller 30 that detects the signal and determines that handle 50 is in the forward position.

When handle 50 is moved to the reverse position, switch 62 connects the solenoid power signal of line 60 to line 66 that extends to reverse solenoid 38, which causes transmission output 34 to move in second direction 42. Line 66 also connects to controller 30 that detects the signal and determines that handle 50 is in the reverse position.

When handle 50 is moved to the neutral position, switch 62 connects the solenoid power signal of line 60 to line 68. Line 68 also connects to controller 30 that detects the signal and determines that handle 50 is in the neutral position. When handle 50 is a respective position providing the signal to one of lines 64, 66, 68, no solenoid power signal is provided to the other respective lines 66, 68, 64. With insufficient power, forward and reverse solenoids 36, 38 will not energize to provide pressurized fluid.

Controller 30 only provides the necessary solenoid power signal to line 60 when certain predetermined conditions are met. If these conditions are not met, forward and reverse solenoids 36, 38 do not receive sufficient power to energize and provide the necessary pressurized fluid for transmission 22 to operate in the forward and reverse conditions.

An example of a precondition for controller 30 to provide a sufficient solenoid power signal occurs at engine startup. According to a preferred embodiment of the present disclosure, controller 30 will not provide sufficient solenoid power to line 60 after engine startup unless TCL handle 50 is first moved to the neutral position. For example, if TCL handle 50 is in the forward or reverse positions after engine startup, controller 30 will not provide sufficient solenoid power to line 60 until TCL handle 50 is moved to the neutral position. Once controller 30 detects that TCL handle 50 is moved to the neutral position, it provides sufficient power to line 60 to energize solenoids 36, 38 when TCL handle 50 is moved to either the forward or reverse positions. As a result, the operator can start engine 20 regardless of the position of TCL handle 50, but transmission 22 will not output engine power until TCL handle 50 is first moved to neutral.

As mentioned above, controller 30 detects the position of TCL handle 50 through lines 64, 66, 68. When controller 30 is providing sufficient solenoid power to line 60, controller 30 detects this power through lines 64, 66, 68 to determine the position of TCL handle 50.

When controller 30 is not providing sufficient solenoid power to line 60, controller 30 can still detect to position of TCL handle 50. To detect the position of TCL handle 50 in this situation, controller 30 provides a detection signal to line 60 that can be detected by controller 30 through lines 64, 66, 68, but the detection signal is insufficient to energize or otherwise normally operate forward and reverse solenoids 36, 38. As a result, the power for solenoids 36, 38 and the signal used to detect the position of TCL handle 50 travel through a common line defined by line 60 and respective lines 64, 66. These lines also define a communication line from controller 30 to transmission 22.

For example, if TCL handle 50 is in the forward position, but a precondition for solenoid operation is not met, controller 30 provides a detection signal through line 60 to transmission control lever 32 that passes through line 64 back to controller 30. Controller 30 detects the detection signal to detect that TCL handle is in the forward position. Based on this information after engine startup, controller 30 would not provide sufficient solenoid power to line 60. In this circumstance, controller 30 sends a reminder signal to an operator display (not shown) reminding the operator to put TCL handle 50 in the neutral position. Controller 30 continues to send the detection signal through line 60 until it detects the signal in line 66 indicating that TCL handle 50 is in the neutral position. Controller 30 then provides sufficient solenoid power to line 60 to power forward and reverse solenoids 36, 38 when TCL handle 50 is moved to the forward and reverse positions, respectively.

According to the preferred embodiment of the present disclosure, the detection signal is voltage pulse having a length insufficient to energize solenoids 36, 38 and the voltage pulse is repeated at regular intervals. According to one embodiment, the voltage pulse has a length of a maximum of 0.2 seconds and occurs every second. The solenoid power signal may be a constant voltage sufficient to energize (or keep energized) solenoids 36, 38.

In one situation, controller 30 sends the detection signal when the operator moves a vehicle key to an ignition OFF position. Controller 30 continues to send one or more variants of the detection signal after the key is moved to an ignition ON position and engine 20 starts. If controller 30 detects that TCL handle 50 is not in neutral, it sends the reminder signal to the display to remind the operator to put TCL handle 50 in neutral. If controller 30 detects that TCL handle 50 is in the neutral position, controller 30 provides the constant voltage that is sufficient to energize solenoids 36, 38.

In addition to controlling solenoids 36, 38 based on the position of TCL handle 50, controller 30 can also control the release of parking brake 28 based on the position of TCL handle 50. At engine startup, parking brake 28 is applied. Controller 30 will not release parking brake 28 until it detects that TCL handle 50 passes through the neutral position at least once and the other requirements for releasing parking brake 28 are met.

The cooperation of transmission control lever 32 and controller 30 also permits transmission control lever 32 to override controller 30. For example, if controller 30 fails and continues to provide a solenoid power signal to line 60 when it should not, an operator can move TCL handle 50 to the neutral position and cut power to solenoids 36, 38. Similarly, as discussed above, controller 30 can override TCL handle 50 by cutting off or not providing a solenoid power signal to line 60 to de-energize or not energize solenoids 36, 38, even though TCL handle 50 is moved to the forward or reverse position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including
    a chassis;
    a plurality of traction devices positioned to support the chassis;
    an engine to power at least one of the plurality of traction devices;
    a transmission positioned between the engine and the at least one traction device; and
    means for controlling the transmission, the control means including an operator input and a controller configured to provide sufficient power to control the transmission through the operator input, the controller being configured to monitor the operator input to determine when to provide the sufficient power.

2. The vehicle of claim 1, wherein the operator input has a forward selection providing input to the transmission to move the vehicle in a forward direction, a reverse selection providing input to the transmission to move the vehicle in a reverse direction, and a neutral selection and the controller permits starting of the engine when the operator input is in the forward selection or the reverse selection.

3. The vehicle of claim 2, wherein the controller prevents the input from the operator input from being delivered to the transmission unless the operator first selects the neutral selection.

4. The vehicle of claim 1, wherein the operator input has a forward selection providing input to the transmission to move the vehicle in a forward direction, a reverse selection providing input to the transmission to move the vehicle in a reverse direction, and a neutral selection and the controller prevents the input from the operator input from being delivered to the transmission unless the operator first selects the neutral selection.

5. The vehicle of claim 1, wherein the sufficient power passes through the operator input.

6. The vehicle of claim 5, wherein the controller sends a signal through the operator input to determine a gear selection provided by the operator.

7. The vehicle of claim 6, wherein the sufficient power and the signal pass through a common line.

8. A vehicle including
    a chassis;
    a plurality of traction devices positioned to support the chassis;
    an engine to power at least one of the plurality of traction devices;
    a transmission positioned between the engine and the at least one traction device;
    a gear selector positioned to receive input from an operator of the vehicle to determine the direction of travel of the vehicle;
    a controller configured to receive input from the gear selector and control operation of the transmission, and
    a communication line providing communication from the controller to the transmission, the gear selector being positioned along the communication line between the controller and the transmission.

9. The vehicle of claim 8, wherein the controller provides a signal along the communication line to determine the input to the gear selector provided by the operator.

10. The vehicle of claim 9, wherein the signal provided by the controller is provided to the transmission.

11. The vehicle of claim 8, wherein the controller provides power to the transmission through the communication line to power movement of an electromechanical device of the transmission.

12. The vehicle of claim 11, wherein electromechanical device is a solenoid valve controlling the flow of fluid within the transmission.

13. The vehicle of claim 11, wherein the controller provides a signal to the transmission through the communication line that is insufficient to power movement of the electromechanical device.

14. The vehicle of claim 8, wherein the gear selector has a forward selection providing input to the transmission to move the vehicle in a forward direction, a reverse selection providing input to the transmission to move the vehicle in a reverse direction, and a neutral selection and the controller permits starting of the engine when the operator input is in the forward selection or the reverse selection.

15. A vehicle including
    a chassis;
    a plurality of traction devices positioned to support the chassis;
    an engine to power at least one of the plurality of traction devices;
    a transmission positioned between the engine and the at least one traction device;
    a gear selector positioned to receive input from an operator of the vehicle to determine the direction of travel of the vehicle;
    a controller configured to receive input from the gear selector and control operation of the transmission, and
    a power line providing operative power to the transmission and a signal to the controller, the controller determining the input of the operator to the gear selector based on the signal received from the power line.

16. The vehicle of claim 15, wherein the power line receives the signal from the controller that the controller detects to determine the input of the operator to the gear selector.

17. The vehicle of claim 16, wherein the power line provides the signal to the transmission.

18. The vehicle of claim 17, wherein the transmission includes an electromechanical device receiving the signal and the signal is insufficient to power movement of the electromechanical device.

19. The vehicle of claim 18, wherein the controller provides the operative power to the power line.

20. The vehicle of claim 15, wherein the gear selector includes a multi-position switch having a plurality of output lines, at least one of the output lines defining a portion of the power line, and the controller includes a plurality of inputs coupled to the plurality of output lines of the gear selector.

* * * * *